United States Patent [19]

Yoshida et al.

[11] Patent Number: 5,298,203
[45] Date of Patent: Mar. 29, 1994

[54] PROCESS FOR PRODUCING FIBER AGGREGATE

[75] Inventors: Takashi Yoshida; Tomohito Ito; Fukuo Gomi; Hidetoshi Hirai, all of Kariya, Japan

[73] Assignee: Kabushiki Kaisha Toyoda Jidoshokki Seisakusho, Kariya, Japan

[21] Appl. No.: 942,954

[22] Filed: Sep. 10, 1992

[30] Foreign Application Priority Data

Sep. 21, 1991 [JP] Japan ................................. 3-242144

[51] Int. Cl.$^5$ ............................................... B29C 35/08
[52] U.S. Cl. ....................................... 264/24; 162/102; 162/192; 264/108
[58] Field of Search ............... 264/24, 108; 162/102, 162/192

[56] References Cited

U.S. PATENT DOCUMENTS

| | | | |
|---|---|---|---|
| 3,497,419 | 2/1970 | Winer et al. | 162/192 |
| 4,938,844 | 7/1990 | Ito et al. | 162/102 |
| 4,975,149 | 12/1990 | Ito et al. | 162/102 |
| 5,059,107 | 10/1991 | Isomura et al. | 425/174.8 R |
| 5,196,212 | 3/1993 | Knoblach | 425/174.8 R |

Primary Examiner—Mary Lynn Theisen
Attorney, Agent, or Firm—Brooks Haidt Haffner & Delahunty

[57] ABSTRACT

A process for producing fiber aggregate which comprises the steps of coating a conductive material which is insoluble in a dielectric fluid on the surface of fibers; dispersing the fibers into the dielectric fluid to obtain a fiber suspended fluid; introducing the fiber suspended fluid into an electric field which is generated in a space between a positive electrode and a negative electrode, whereby causing individual fibers to electrostatically and one-dimensionally orient; and aggregating the oriented fibers. The conductive material contributes to charge-transfer, and it causes the fibers in the electric filed to orient stably.

6 Claims, 3 Drawing Sheets

PROCESS FOR PRODUCING FIBER AGGREGATE

BACKGROUND OF THE INVENTION

1. Field of the Invention

The present invention relates to a process for producing fiber aggregate.

2. Description of the Related Art

Conventionally, a process for producing fiber aggregate in which most fibers are about one-dimensionally oriented has been known (Japanese Laid-Open Patent Publication No. 162062/1987). According to this method, fibers are dispersed into a dielectric fluid. The obtained fiber suspended fluid is introduced into an electric field which is generated in a space between a positive electrode and a negative electrode. This causes individual fibers in the dielectric fluid to electrostatically and one-dimensionally orient. The electrostatically oriented fibers gradually settle and collect by filtering the dielectric fluid.

However, in the above-mentioned conventional method, each individual fiber has a different surface condition because of the difference in its kind and a manufacturing lot. As the result, the fibers cannot be oriented stably when they are introduced into the electric field. This causes the obtained fiber aggregate to be a poor quality.

SUMMARY OF THE INVENTION

The present invention was completed to overcome the above-mentioned disadvantage.

It is an object of the present invention to provide a process for producing fiber aggregate in which each individual fiber is one-dimensionally oriented.

According to the present invention, it is characterized that a conductive film which is insoluble in a dielectric fluid is formed on the surface of the individual fibers. The fibers are in the form of short fiber, whisker, or a mixture thereof, and they are dispersed into a dielectric fluid. The obtained fiber suspended fluid is introduced into an electric field which is generated in a space between a positive electrode and a negative electrode. This causes individual fibers in the dielectric fluid to electrostatically and one-dimensionally orient. The electrostatically oriented fibers gradually settle and collect by filtering the dielectric fluid.

The above-mentioned conductive film may be a very thin film for covering the surface of each of fibers. And the film may be a single molecular layer or an adsorption film. To make the conductive film, a conductive material such as an aqueous solution or a surfactant, which is insoluble in the dielectric fluid, is coated on the surface of the fibers. The method for coating is as follows. The fibers and the conductive material are introduced into a solvent in which the conductive material is dissolved. The mixture is agitated for a predetermined time and is filtered. After filtering, fibers are taken out and dried. The obtained fibers have the film on their surfaces.

Concerning the conductive material which is insoluble in the dielectric fluid, it should be water or water soluble surfactant when silicone oil is used as the dielectric fluid. When (FREON) chlorofluorocarbon is used as the dielectric fluid, it should be an oily substance. Examples of the conductive material which is water soluble include (PLYSURF) A212E nonionic surfactant. Examples of the conductive material which is oily include (PLYSURF) A207H nonionic surfactant. When carbon tetrachloride, benzene, n-hexane, cyclohexane, or fluorine-and chlorine-substituted hydrocarbons is used as the dielectric fluid, any one of the above-mentioned conductive materials can be used. Generally speaking, it is preferable that there is a wide difference of a solubility parameter between the dielectric fluid and the conductive material.

In the process for producing fiber aggregate according to the present invention, fibers covered with a conductive film are dispersed into the dielectric fluid to obtain the fiber suspended fluid.

The above-mentioned fibers are in the form of short fiber, whisker, or a mixture thereof. Short fibers and whiskers of any kind can be used. They are not specifically limited in diameter and length. Also, they are not limited in material so long as they are capable of electrostatic orientation in the dielectric fluid when the fiber suspended fluid is introduced into the electric field. The material of the fiber includes, for example, alumina, silica, alumina-silica, beryllia, carbon, silicon carbide, glass, and metals.

The dielectric fluid means a fluid which exhibits the dielectric properties upon application of a voltage. Examples of the dielectric fluid include, for example, silicone oil, carbon tetrachloride, benzene, n-hexane, cyclohexane, or fluorine- and chlorine-substituted hydrocarbon.

The above-mentioned fiber suspended fluid is introduced into an electric field which is generated in a space between a positive electrode and a negative electrode. In the dielectric fluid, individual fibers are electrostatically oriented, with one end pointing to the positive electrode and the other end pointing to the negative electrode. More preferably, the electrostatically oriented fibers are stringed to one another, and they gradually settle.

The electric field which is generated in a space between a positive electrode and a negative electrode is usually about 0.1 to 5 kV/cm. The electric field weaker than 0.1 kV/cm is not enough for the electrostatic orientation of fibers. The electric field stronger than 5 kV/cm disturbs the dielectric fluid and interferes with the orientation of fibers. In order to prevent the disturbance of the dielectric fluid and to improve the electrostatic orientation of fibers, preferred electric field is about 1 to 2 kV/cm. The electric field is preferably AC electric field (the intensity of the electric field being 0.2 to 1.5 kV/cm, the frequency being about 0.5 to 1 kHz). Applicable electric field should be properly established according to the dielectric properties of the fibers and dielectric fluid to be used and the thickness of the fiber aggregate to be produced.

The above-mentioned electrostatic oriented fibers gradually settle and collect to be fiber aggregate in which most fibers are about one-dimensionally oriented. The stringing fibers settle faster than discrete fibers. The aggregation of fibers can be performed by gravitationally settling the fibers. It also can be performed by filtering the dielectric fluid in the direction perpendicular to the direction of the orientation of the fibers. The filtering can be performed in the state of vacuum suction. The settling time of fibers can be adjusted by the vacuum suction.

According to the process of the present invention, the conductive film which is insoluble in the dielectric fluid is formed on the surface of the individual fibers. When the fibers are electrostatically oriented, surface conduction by means of the conductive film contributes to charge-transfer. This increases the speed and degree of polarization of individual fibers. Therefore, the orientation of fibers is improved.

The above-mentioned conductive film is hardly dissolved into the dielectric fluid, so electric conductivity of the dielectric fluid scarcely deteriorates. Therefore, electrostatic orientation of fibers cannot be easily interfered. Furthermore, recycling of the dielectric fluid is effectively performed.

When the conductive film is made of a surfactant which is insoluble in the dielectric fluid, this prevents the fibers from being aggregated and it stabilizes the suspension.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The Preferred Embodiments according to the present invention will be hereinafter described with reference to FIGS. 1 through 4.

First Preferred Embodiment

Figure 1:
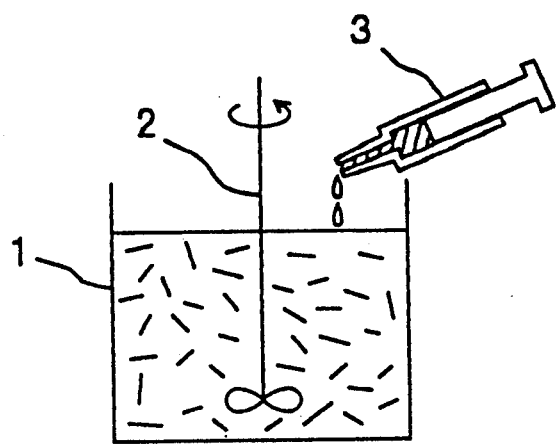
FIG. 1 shows that fibers are agitated in a dispersion medium.

In the First Preferred Embodiment, as shown in FIG. 1, SiC whiskers or fibers (average diameter being 0.6 $\mu$m, average length being 10 to 80 $\mu$m) were introduced into water contained in a vessel 1. The water was used as a solvent. The fibers were agitated by an agitator 2 and dispersed into the water. A water soluble surfactant (PLYSURF)A212E, which was insoluble in a dispersion medium of a dielectric fluid (described later), was used as a conductive material. The water soluble surfactant was added by a charge means 3. The surfactant had been agitated for a predetermined time, and was absorbed on the surface of the fibers.

Figure 2:
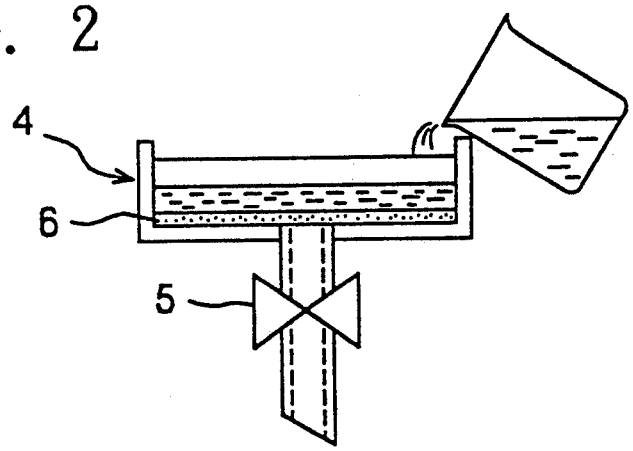
FIG. 2 shows that the dispersion medium is filtered.

As shown in FIG. 2, the above-mentioned water containing the fibers and the surfactant was introduced into a filter means 4. Then, the water was filtered through a filter 6, and was discharged by way of a valve 5.

The obtained fibers which remained on the filter 6 were put into a drying vessel. Then, the fibers had been heated for 720 minutes at 100° C., and the solvent water was fully evaporated and removed. Therefore, a conductive film was formed on the surface of the fibers. The conductive film was an adsorption film comprising the surfactant which was insoluble in the dielectric fluid.

Figure 3:
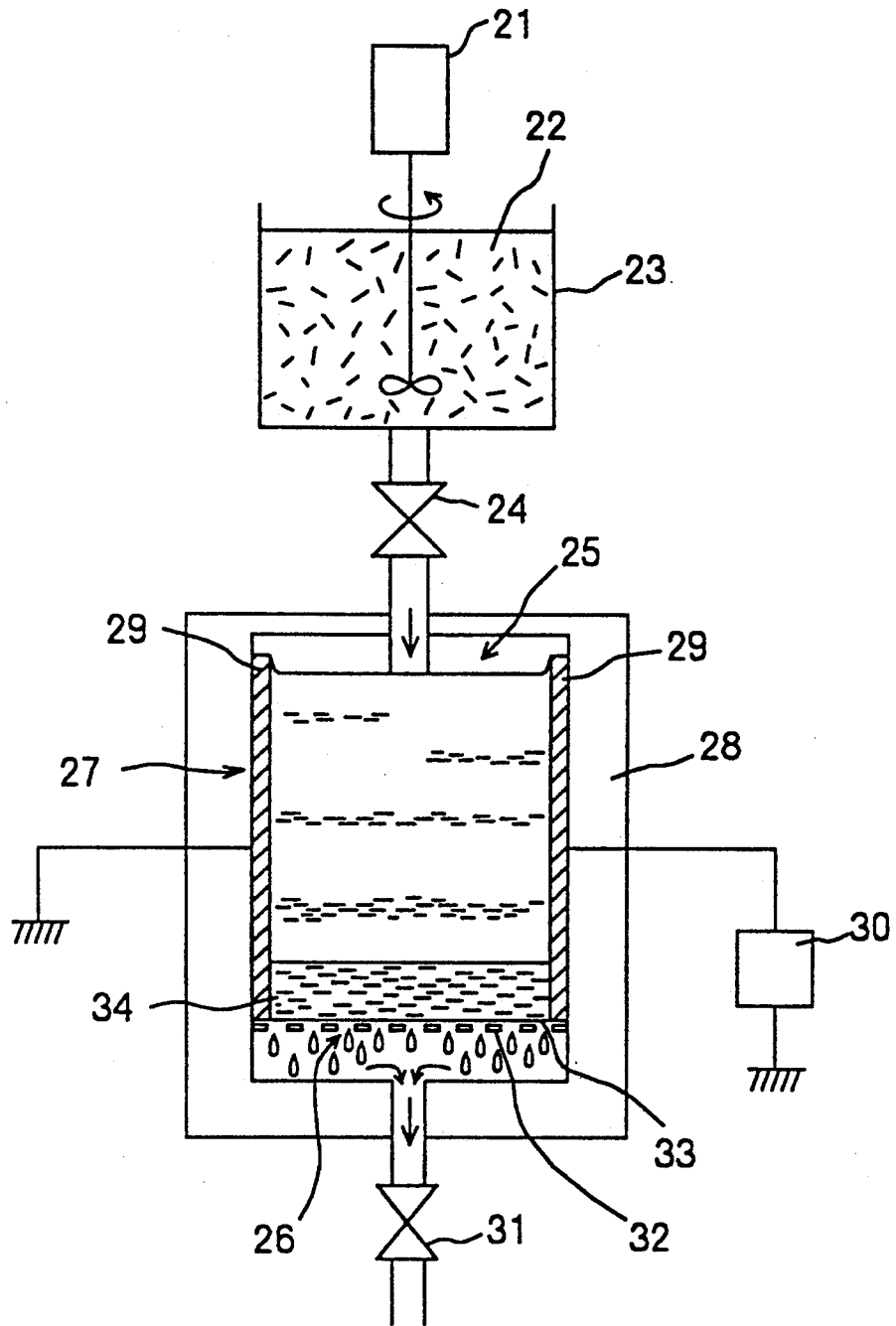
FIG. 3 shows an apparatus for producing fiber aggregate.

An apparatus for manufacturing fiber aggregate is shown in FIG. 3 and a method for producing the same is described as follows.

A vessel 23 is filled with a fiber suspended fluid 22 and has an agitator 21. An orientation vessel 28 comprises a receptacle 25, a discharge portion 26 and an orientation space 27. The receptacle 25 receives the fiber suspended fluid 22 from the vessel 23 by way of a valve 24. The discharge portion 26 discharges a dielectric fluid. The orientation space 27 is provided between the receptacle 25 and the discharge portion 26 and it causes fibers to one-dimensionally orient. A paired positive and negative electrodes 29 are vertically disposed a certain distance apart horizontally in the orientation space 27 of the orientation vessel 28. A voltage source 30 applies a predetermined voltage across the positive and negative electrodes 29. A valve 31 adjusts a discharge of the dielectric fluid from the discharge portion 26. A filter plate 32 and a filter paper 33 are provided on the discharge portion 26.

The above-mentioned fibers were introduced into a dielectric fluid (silicone oil) contained in the vessel 23. The fluid was fully agitated by the agitator 21 to obtain a fiber suspended fluid.

An AC electric field (the intensity of the electric field being 1 kV/cm, the frequency being about 1 kHz) was generated in a space between the paired positive and negative electrodes 29 by means of the voltage source 30. The fiber suspended fluid 22 was introduced from the vessel 23 to the receptacle 25 by way of the valve 24. The paired positive and negative electrodes 29 were immersed into the fiber suspended fluid 22. This caused the fibers in the fiber suspended fluid 22 to electrostatically and one-dimensionally orient and to string to one another at the orientation space 27.

The dielectric fluid was discharged from the discharge portion 26 to the valve 31 by way of the filter plate 32 and the filter paper 33. The above-mentioned oriented fibers gradually settled and collected to obtain fiber aggregate 34.

According to the process of the present invention, the conductive film was formed on the surface of the individual fibers. The film prevented fibers aggregating and stabilized the suspension. So, the dispersibility of the fibers was improved. When the fibers were electrostatically oriented, surface conduction by means of the conductive film contributed to charge-transfer. This increased the speed and degree of polarization of individual fibers. Therefore, the orientation of fibers was improved.

The above-mentioned conductive film is made of the surfactant which is insoluble in silicone oil as the dielectric fluid. Since the conductive film is hardly dissolved into the dielectric fluid, electric conductivity of the dielectric fluid scarcely deteriorates. Therefore, electrostatically orientation of fibers cannot be easily interfered.

As above-described, since the individual fibers was hardly affected by its surface condition, the orientation of fibers scarcely deteriorates when the fibers were electrostatically oriented. Therefore, the fibers were stably oriented.

Moreover, as above-described, since the conductive material is hardly dissolved into the dielectric fluid, electric conductivity of the dielectric fluid scarcely deteriorates. Therefore, electrostatically orientation of fibers cannot be easily interfered. Furthermore, recycling of the dielectric fluid is effectively performed.

This is advantageous to costs and environmental protection.

Second Preferred Embodiment

Figure 4:
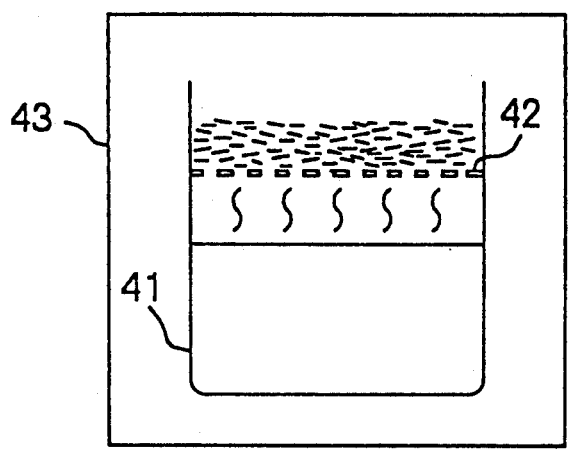
FIG. 4 shows the Second Preferred Embodiment according to the present invention.

A Second Preferred Embodiment employed the same process and the same material as described in the First Preferred Embodiment except that water was used as the conductive material instead of the water soluble surfactant. As shown in FIG. 4, fibers were introduced into a filter 42 which is established on a vessel 41. Then, the vessel 41 was put into a thermostatic vessel 43, and it had been heated for 30 minutes at 70° C. Therefore, water was coated on the surface of the fibers.

The above-mentioned fibers were used to manufacture fiber aggregate.

As above-described, according to the process of the present invention, the individual fibers is hardly affected by its condition and they can be stably and electrostatically oriented. Therefore, it is possible to manufacture fiber aggregate having good quality. Furthermore, recycling of the dielectric fluid is effectively performed. This is advantageous to costs and environmental protection.

What is claimed is:

1. A process for producing fiber aggregate which comprises the steps of:
   coating fibers with a conductive material which is insoluble in a dielectric fluid;
   dispersing said coated fibers in said dielectric fluid to obtain a fiber suspended fluid;
   introducing said fiber suspended fluid into an electric field which is generated in a space between a positive electrode and a negative electrode, thereby causing said fibers to individually electrostatically and one-dimensionally orient; and
   aggregating said oriented fibers, thereby producing fiber aggregate in which said fibers are oriented.

2. A process according to claim 1, wherein said conductive material is a surfactant.

3. A process according to claim 1, wherein said conductive material is water.

4. A process according to claim 1, wherein said fiber is a short fiber, whisker, or a mixture thereof.

5. A process according to claim 1, wherein said dielectric fluid is one selected from the group consisting of carbon tetrachloride, benzene, n-hexane, cyclohexane, and fluorine- and chlorine-substituted hydrocarbons.

6. A process according to claim 1, wherein said electric field is within the range of 0.1 to 5 kV/cm.

* * * * *